United States Patent [19]

Teraoka

[11] Patent Number: 5,441,461
[45] Date of Patent: Aug. 15, 1995

[54] LIMITED SLIP DIFFERENTIAL GEAR ASSEMBLY

[75] Inventor: Masao Teraoka, Tochigi, Japan

[73] Assignee: Tochigifujisangyo Kabushiki Kaisha, Japan

[21] Appl. No.: 93,938

[22] Filed: Jul. 19, 1993

[30] Foreign Application Priority Data

Jul. 20, 1992 [JP] Japan .................................. 4-191950
Jul. 21, 1992 [JP] Japan .................................. 4-194008

[51] Int. Cl.6 ............................................. F16H 48/10
[52] U.S. Cl. ..................................................... 475/252
[58] Field of Search ............... 475/252, 248, 159, 160, 475/249

[56] References Cited

U.S. PATENT DOCUMENTS

| | | | |
|---|---|---|---|
| 3,768,336 | 10/1973 | Wharton | 475/252 O |
| 5,055,096 | 10/1991 | Riemscheid et al. | 475/252 X |
| 5,122,102 | 6/1992 | Chludek et al. | 475/252 O |
| 5,176,591 | 1/1993 | Krisher | 475/252 O |
| 5,232,417 | 8/1993 | Amborn et al. | 475/248 X |

Primary Examiner—Dirk Wright
Attorney, Agent, or Firm—Samuels, Gauthier & Stevens

[57] ABSTRACT

Disclosed is a differential gear assembly. The assembly comprises a case which is rotated by a driving force of a power source and has a pair of walls extending substantially radially and defining axial ends of the case. First and second side gears are coaxially arranged within the case and supported in such a manner that the first and the second side gears are individually rotatable with respect to the rotation axis of the case relative to the case, and they are adapted to be connected to first and second output shafts, respectively. At least one pair of first and second pinion gears are arranged in parallel to the rotation axis of the case, and the first pinion gear has first and second gearing portions, the second pinion gear having third and fourth gearing portions, the first gearing portion being engaged with the third gearing portion, the second gearing portion being engaged with the first side gear, and the fourth gearing portion being engaged with the second side gear. Formed on the case are at least one pair of a first opening for fittingly receiving the first pinion gear and a second opening for fittingly receiving the second pinion gear. Each of the openings is formed in either one of the walls in such a manner that an outer circumferential portion of the first pinion gear is surrounded by the first opening and an outer circumferential portion of the second pinion gear is surrounded by the second opening in which the outer circumferential portions of the first and second pinion gears penetrate the first and second openings, respectively.

31 Claims, 5 Drawing Sheets

LIMITED SLIP DIFFERENTIAL GEAR ASSEMBLY

BACKGROUND OF THE INVENTION

1. Field of the Invention

The present invention relates to a limited slip differential gear assembly for use in a driving system for vehicles and the like.

2. Description of the Prior Art

Generally, a limited slip differential gear assembly used in a vehicle is prepared to handle the occurrence of slippage or skidding of one tire by providing a sufficient rotation force to the other tire which is not experiencing slippage. For example, such a limited slip differential gear assembly is disclosed in Japanese Laid-Open Patent Publication No.(Kokai)49(1974)-104828.

The differential gear assembly disclosed in the above-referenced publication comprises: a case for receiving rotational input power to rotate with respect to a rotational axis; a pair of side gears aligned in the case coaxially with the rotational axis; and a few pairs of elongated pinion gears arranged in parallel to the rotational axis. Each pinion gear has gear teeth with circumferential surfaces and is received in a cylindrical bore so as to movably supported by the cylindrical bore surface. Two cylindrical bores for the paired pinion gears overlap each other so that the half portions of the paired pinion gears at the central portion of the case can be engaged with each or‚her. Moreover, the other half portion of one pinion gear of the pair is engaged with one of the side gears at one end portion of the case, and that of the other pinion gear is engaged with the other side gear at the opposite end portion of the case. Each of the side gears is connected with each of the drive shafts, or the left and right axles connected to the wheels of the vehicle, respectively.

In the above conventional gear assembly, each of the pinion gears being rotatably supported on the bore surfaces and movable in the cylindrical bores is axially positioned at both ends thereof. Specifically, one end of the pinion gear at the central side abuts a flat terminal surface of the cylindrical bore, and the other end which extends to the end of the side gear is stopped by a flat side wall which is fixed to the opening of the cylindrical bore by a snap ring to close the cylindrical bore.

According to the above structure, in order for the axes of the pinion gears to be stably positioned, the pinion gears are not supported very tightly. Consequently, the pinion gears tend to move easily and incline. Moreover, the cylindrical bores are completely closed by the side walls, making it impossible to supply additional lubricant to the pinion gears. As a result, lubrication of the pinion gears deteriorates over time, thus giving rise to a progressive in decrease in the durability of the pinion gears.

SUMMARY OF THE INVENTION

In order to solve the above-mentioned problems, it is an object of the present invention to provide a limited slip differential gear assembly which assures proper support of pinion gears and which can improve the durability of the pinion gears.

For accomplishing the above-mentioned object, a differential gear assembly according to the present invention comprises: a case being rotatable around a rotation axis in response to a driving force of a power source and having a pair of walls extending substantially radially and defining axial ends of the case; first and second side gears coaxially arranged within the case and supported in such a manner that the first and the second side gears are individually rotatable with respect to the rotation axis of the case relative to the case, the first and the second side gears being adapted to be connected to first and second output shafts, respectively; at least one pair of first and second pinion gears, each of which has a center axis parallel to the rotation axis of the case, the first pinion gear having first and second gearing portions, the second pinion gear having third and fourth gearing portions, the first gearing portion being engaged with the third gearing portion, the second gearing portion being engaged with the first side gear, and the fourth gearing portion being engaged with the second side gear; and at least one pair of a first opening for fittingly receiving the first pinion gear and a second opening for fittingly receiving the second pinion gear, each of the openings being formed in either one of the walls of the case in such a manner that an outer circumferential portion of the first pinion gear is surrounded by the first opening and an outer circumferential portion of the second pinion gear is surrounded by the second opening in which the outer circumferential portions of the first and second pinion gears penetrate the first and second openings, respectively.

In accordance with the above construction, the end portions of the first and second pinion gears are received by the first and second openings, and the outer circumferences of the pinion gears are fittingly surrounded by the walls of the case. In this way, the entire peripheries of the pinion gears are supported by the walls so that the end portions are firmly held at the openings.

Moreover, the above-described end portions of the pinion gears protrude out of the walls of the case and are exposed to the outside of the differential case. Accordingly, lubrication oil can be introduced from the outside of the differential case along the teeth into the first and second bores in accordance with rotation of the first and second pinion gears. Thus it is easy to provide a lubricant to the inside of the first and second bores.

BRIEF DESCRIPTION OF THE DRAWINGS

The features and advantages of the differential gear assembly according to the present invention will be more clearly understood from the following description of the preferred embodiments of the present invention taken in conjunction with the accompanying drawings, in which like reference numerals designate the same or similar elements or sections throughout; the figures thereof and in which.

DETAILED DESCRIPTION OF THE INVENTION

Now, preferred embodiments according to the present invention will be described below with reference to the accompanied drawings. These embodiments are suitable for use as a final drive gear for vehicles.

Figure 1:
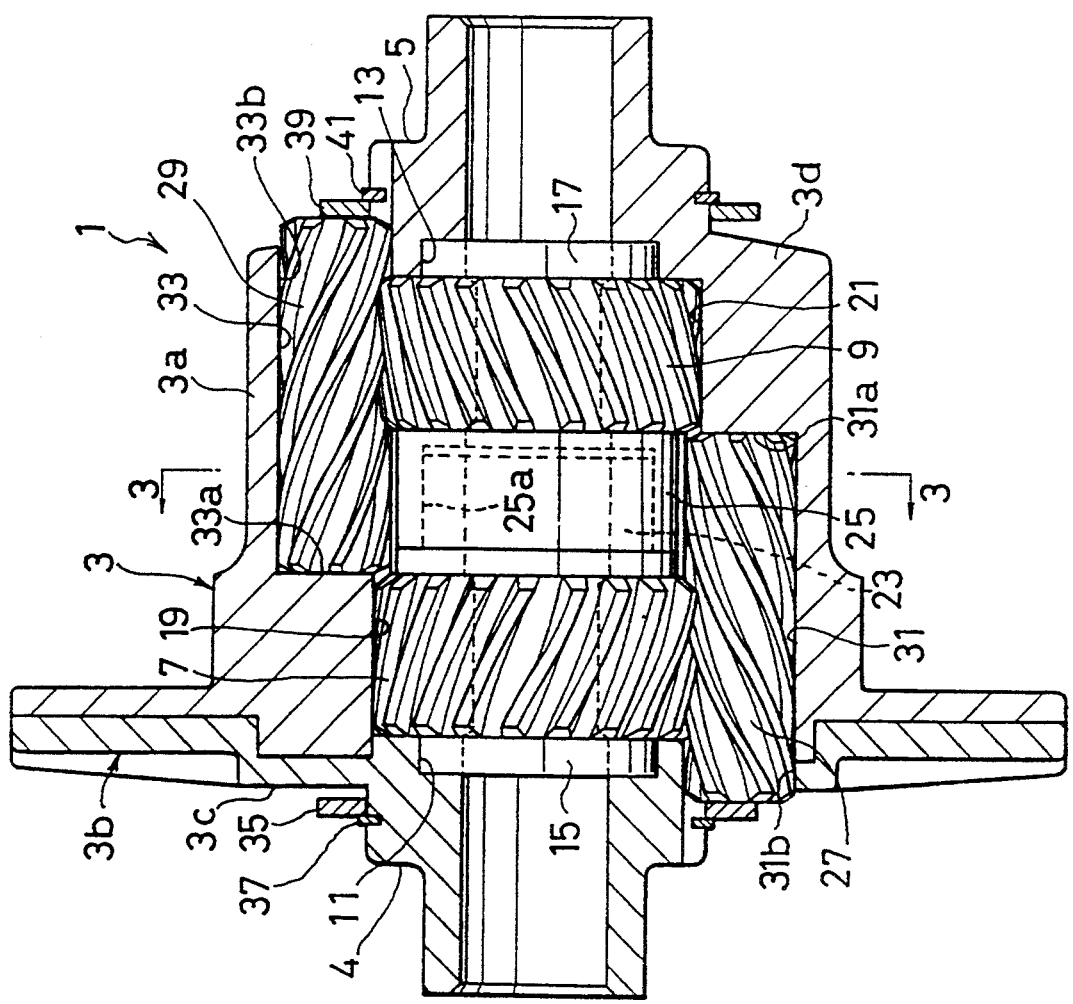
FIG. 1 is a front sectional view showing a first embodiment of a differential gear assembly according to the present invention.
Figure 2:
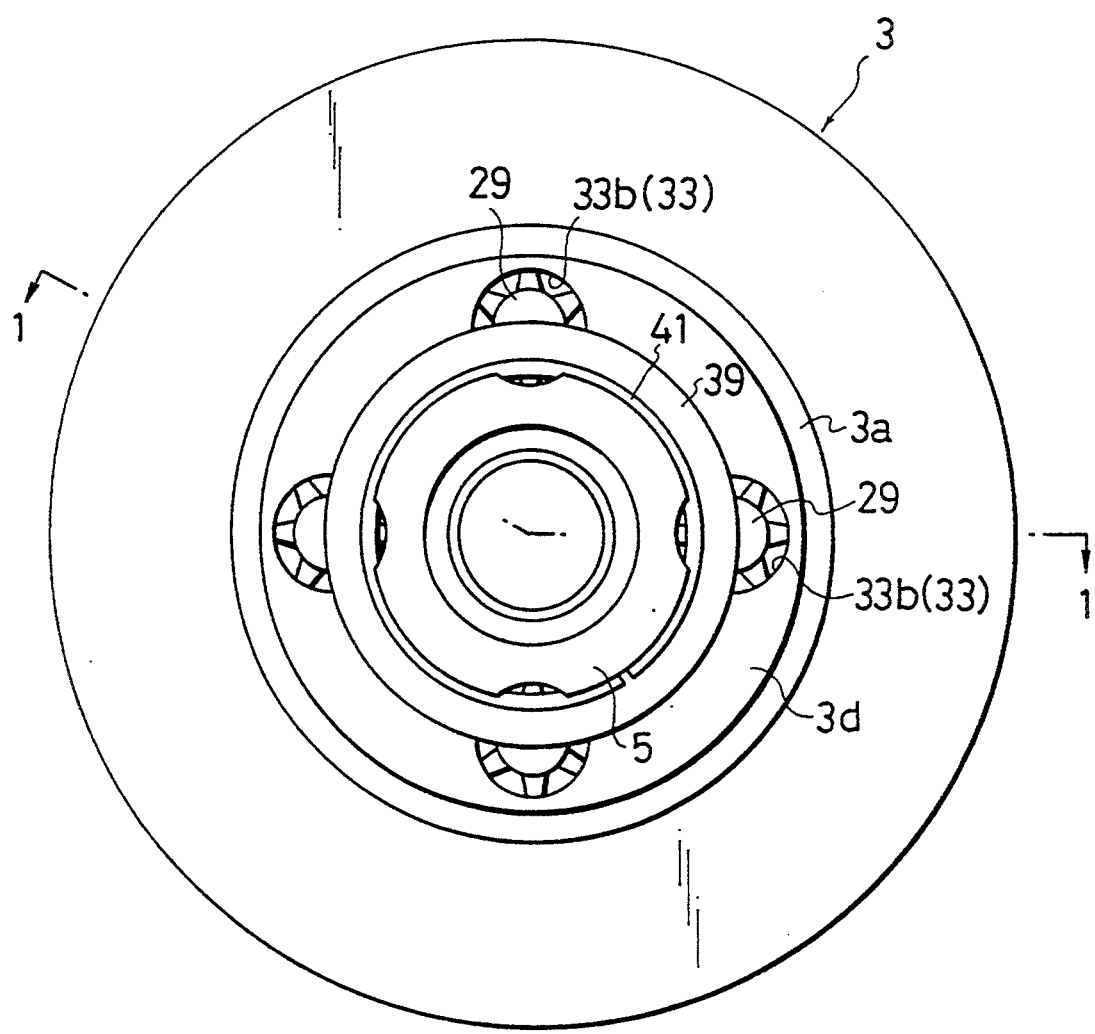
FIG. 2 is a side view of the differential gear assembly illustrated in FIG. 1.
Figure 3:
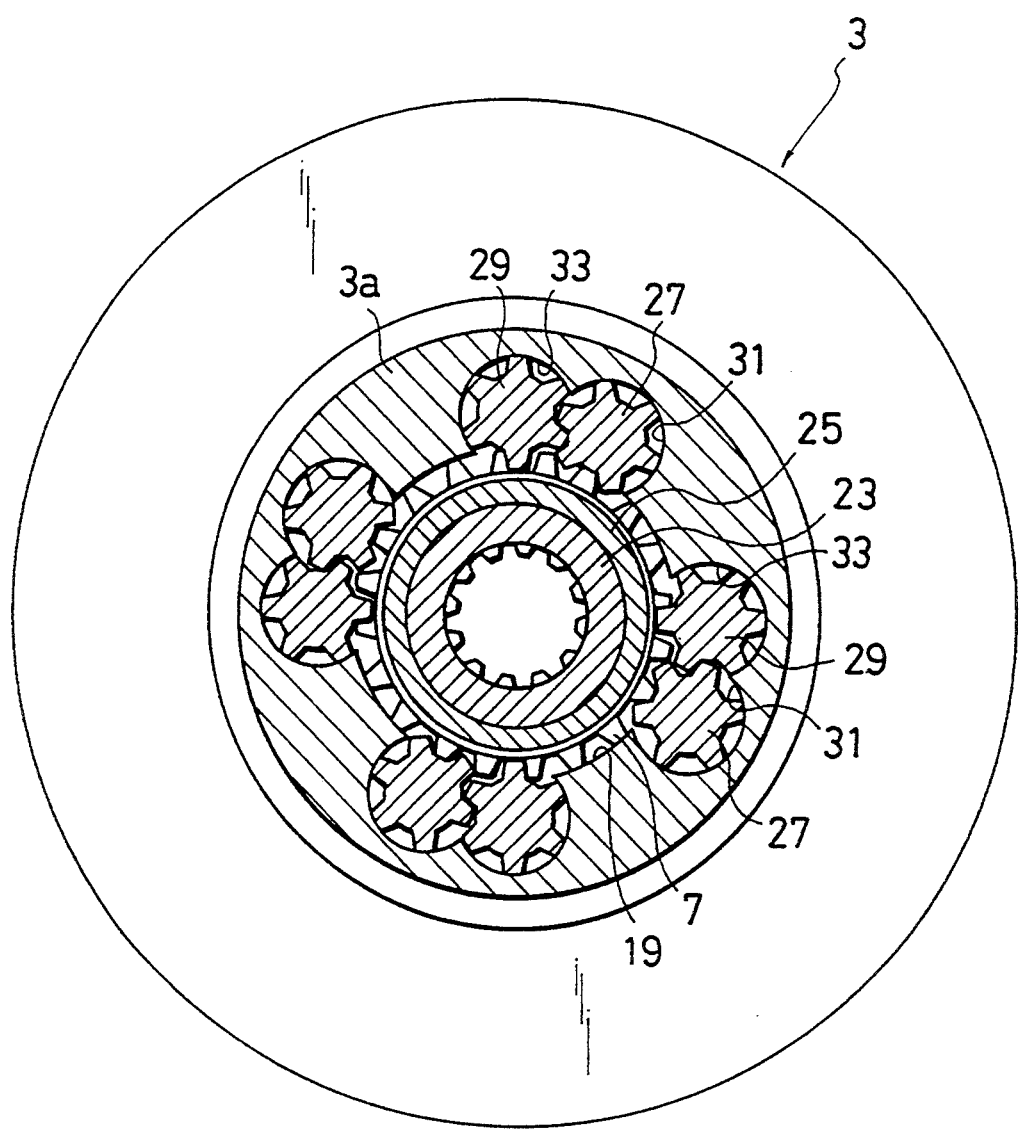
FIG. 3 is a sectional view of the differential gear assembly taken along the line 3—3 in FIG. 1.

FIG. 1 is a front sectional view of the first embodiment of the limited slip differential gear assembly according to the present invention and corresponds to the sectional view taken along the line 1—1 in FIG. 2. FIG. 2 is a side view of the differential gear assembly illustrated in FIG. 1. FIG. 3 is a sectional view of the differential gear assembly taken along the line 3—3 in FIG. 1. The structure of the differential gear assembly will presently be described.

Referring to FIG. 1, a differential gear assembly 1 comprises a differential case 3 which includes a cylindrical body 3a and a cover 3b which is fastened by bolts or the like (not shown) to an axial end portion of the case body 3a, as depicted by the left side of the drawing.

Formed on the axially opposite ends of the differential case 3 are two boss portions 4 and 5 at which the differential case 3 is supported with a bearing inside a differential carrier so that the differential case 3 can be rotated with respect to the central axis or a rotational axis of the differential case 3. Moreover, the differential case 3 is fixed with a ring gear engaged with a drive pinion gear which is provided at the side of a propeller shaft, whereby rotational power is transmitted from an engine through the propeller shaft, the drive pinion gear and the ring gear to the differential case 3. (This transmission construction is omitted from the drawings.)

As shown in FIG. 1, inside the differential case 3, a pair of left and right side gears 7 and 9 are arranged coaxially with the rotational axis of tile differential case 3. The left and right side gears 7 and 9 are rotatably supported on the differential case 3 via guide bosses 15 and 17 through left and right support openings 11 and 13 which are formed in the boss portions 4 and 5 of the differential case 3, respectively.

At the left side of the case body 3a in FIG. 1, the case body 3a of the differential case 3 is axially bored from the end face to which the cover 3b is attached so as to form left and right cylindrical receiving holes 19 and 21 for receiving the side gears 7 and 9. Each of the side gears 7 and 9 is inserted in each of the left and right receiving holes 19 and 21, respectively, so that the circumferential tip surfaces of the peripheral teeth of the side gears 7 and 9 can slide on the cylindrical inner surfaces of the receiving holes 19 and 21. Moreover, at the central portion of the differential case 3, the side gears 7 and 9 are mated to each other with spacing bosses 23 and 25 interposed between the side gears 7 and 9 in such a manner that the side gears 7 and 9 can be rotated relative to each other. In this embodiment, the spacing boss 23 of the left side gear 7 is inserted into a cylindrical concave 25a of the spacing boss 25 of the right side gear 9 so that the outer circumference of the spacing boss 23 contacts with the inner surface of the cylindrical concave 25a.

The left side gear 7 is connected with a spline to a drive axle for driving a left wheel of a vehicle, and the right side gear 9 is similarly connected to a drive axle for a right wheel.

Referring to FIGS. 1 through 3, the differential gear assembly of this embodiment has four pairs of first and second pinion gears 27 and 29 which are symmetrically disposed around the side gears 7 and 9 parallel to the rotational axis of the differential case 3 with an angle of 90° between each two adjacent pairs of pinion gears. For each pair, the right portion of the first pinion gear 27 is engaged with the left portion of the second pinion gear 29 at the axially intermediate portion of the differential case 3. Moreover, the left portion of the first pinion gear 27 is engaged with the left side gear 7, and the right portion of the second pinion gear 29 is engaged with the right side gear 9.

Moreover, four pairs of first and second cylindrical bores 31 and 33 are formed in the differential case 3, respectively, for receiving each pair of the pinion gears. The axes of the first and second cylindrical bores 31 and 33 are parallel to tile rotational axis of the left and right side gears 7 and 9.

The pairs of first and second pinion gears 27 and 29 described above are arranged in the differential case 3 with similar positional and operative relationships between the first and second pinion gears 27 and 29 and the side gears 7 and 9. Therefore, the following description about the construction and operation of the gear assembly will be made with reference to a single pair of pinion gears.

The first cylindrical bore 81 for receiving the first pinion gear 27 is bored from the left side end face of the case body 8a, or from the side at which the cover 3b is attached, and the first pinion gear 27 is supported by the bore surface of the first bore 31 at the circumferential peripheries of the teeth thereof, so that the pinion gear 27 can rotate in the bore 81 with respect to its axis. The cylindrical first bore 81 is overlapped with the left cylindrical receiving hole 19 so that the first pinion gear 27 can be engaged with the left side gear 7 at the overlapped space.

Adjacent to the first bore 31, the second cylindrical bore 33 is bored from the right side end of the case body 3a, or the side opposite the side attached with the cover 3b. The second pinion gear 29 is supported by the bore surface of the second bore 33 at the circumferential peripheries of the teeth thereof, so that the pinion gear 29 can rotate in the bore 33 with respect to its axis. The second bore 33 is overlapped with the right receiving hole 21 so that the second pinion gear 29 can be engaged with the right side gear 9 at the overlapped space. Additionally, the first and second bores 31 and 33 are overlapped with each other at the axially intermediate portion of the differential case 3 so that the first and second pinion gears 27 and 29 are engaged with each other at that overlapped space.

For the left and right side gears 7 and 9 and the first and second pinion gears 27 and 29, the peripheral teeth of each gear are formed as helical gears. In this case, the teeth of the left side gear 7 and the second pinion gear 29 are formed into right-hand teeth, and those of the right side gear 9 and the first pinion gear 27 are formed into left-hand teeth.

Each of the pinion gears 27 and 29 is rather tightly fitted in the corresponding bore in order to produce a frictional torque between the bore surface and the peripheral surfaces of the gear teeth by the resistance to rotational motion of the pinion gear in the bore. Therefore, the fitted portions described above are preferably manufactured by using a material having high frictional resistance, for example, surface hardened steel and the like. The frictional torque can also be increased by making a rough bore surface.

As shown in FIG. 1, the right end portion of the first pinion gear 27 contacts with a flat wall 31a which defines the right end of the cylindrical bore 31. The left end portion of the first pinion gear 27 extends to the left side of the left side gear 7 and is rotatably supported at an opening portion 31b which is formed in a left side wall 3c of the cover 3b. Moreover, the first pinion gear 27 slightly protrudes from the left side wall 3c so that the left end portion is exposed to the outside of the differential case 3. The left end portion of the first pinion gear 27 is stopped by a snap ring 37 via a spacer ring 35 which is fitted to the boss portion 4 of the cover 3b, in order to axially position the first pinion gear 27.

Similarly, the left end portion of the second pinion gear 29 contacts with a flat wall 33a which defines the left end of the cylindrical bore 33. The right end portion of the second pinion gear 29 extends to the right side of the right side gear 9 and is rotatably supported at an opening portion 33b which is formed in a right side wall 3d of the cylindrical body 3a. Moreover, the second pinion gear 29 slightly protrudes from the right side wall 3d so that the right end portion is exposed to the outside of the differential case 3. The right end portion of the second pinion gear 29 is stopped by a snap ring 41 via a spacer ring 39 which is fitted to the boss portion 5 of the cylindrical body 3a.

In accordance with the above-described construction, the differential gear assembly 1 is operated as follows.

First, the differential case 3 is rotated with respect to the rotational axis by the drive force of the engine. The first and second pinion gears 27 and 29, being engaged with each other and received by the first and second cylindrical bores 31 and 33, are then rotated with the differential case 3 around the rotational axis. At the same time, the left and right side gears 7 and 9 are also rotated, while being engaged with the first and second pinion gears 27 and 29. As a result, the left and right wheels of the vehicle are rotationally driven through the left and right drive axles which are connected to the left and right side gears 7 and 9, respectively, and the wheels of the vehicle are driven evenly.

If road conditions and the like cause slipping to one of the left and right wheels and a difference is produced between the resistant forces acting on the wheels against the driving forces, the left and right side gears 7 and 9 will try to rotate at different rotational speeds. This means that a relative rotational force will arise between the left and right side gears 7 and 9. In response to this relative rotational force, the first and second pinion gears 27 and 29 will try to rotate with respect to their own axes. At this time, if the relative rotational force is so large that the pinion gears 27 and 29 can rotate against the frictional torques produced between the pinion gears 27 and 29 and the cylindrical bores 31 and 33, the left and right side gears will be able to rotate relative to each other. Accordingly, the differential rotation between the side gears 7 and 9 will be limited by the frictional force.

In the above-described operation, the first and second pinion gears 27 and 29 are rotated in accordance with the differential rotation of the side gears 7 and 9, which are received in the cylindrical bores 31 and 33. During differential rotation, it is possible for the side gears to act in such a way as to move the central axes of the first and second pinion gears 27 and 29. However, in the present invention, first ends of the first and second pinion gears 27 and 29 abut the walls 31a and 33a of the cylindrical bores 31 and 33, and the second ends of the first and second pinion gears 27 and 29 are positioned by the spacer rings 35 and 39 and the snap rings 37 and 41. In addition, the second ends are firmly held at the openings 31b and 33b in such a manner that the entire peripheries of the pinion gears 27 and 29 are surrounded and supported by the side walls 3c and 3d.

Accordingly, the center axes of the first and the second pinion gears 27 and 29 are always maintained parallel to the rotational axes of the first and the second side gears 7 and 9. This results in an increase in the durability of the pinion gears 27 and 29.

Moreover, the above-described second ends of the pinion gears 27 and 29 protrude out of the left and right side walls 3c and 3d and are exposed to the outside of the differential case 3. Accordingly, lubrication oil can be introduced from the outside of the differential case 3 along the helical teeth into the first and second bores 31 and 33 in accordance with rotation of the first and second pinion gears 27 and 29. Therefore, the inside of the first and second bores 31 and 33 can be easily lubricated, making it possible to maintain a proper level of lubrication.

Moreover, in the above construction, the first and second pinion gears can be positioned by only two couples of the spacer rings and the snap rings, irrespective of the number of the pairs of the first and second pinion gears.

Figure 4:
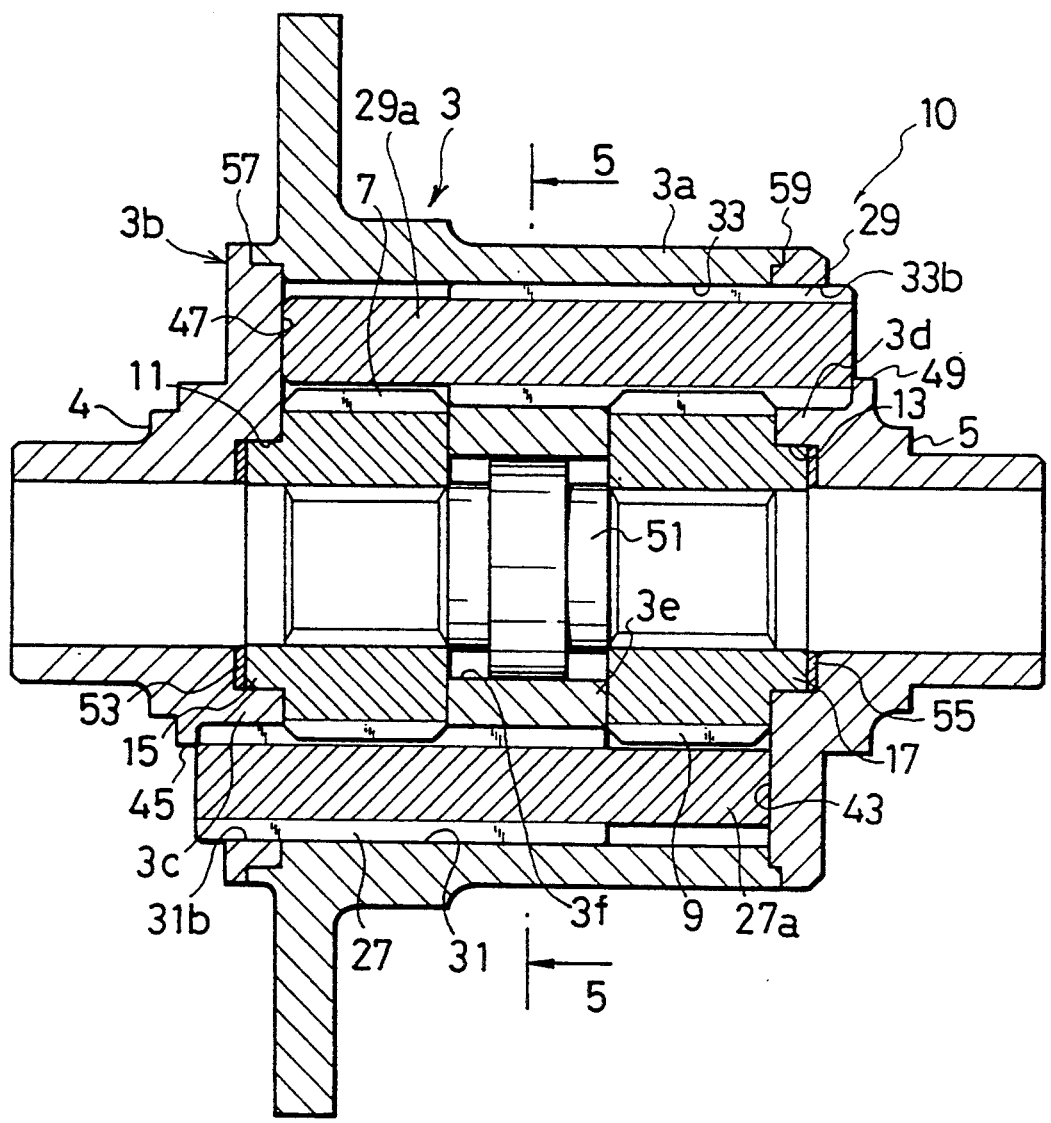
FIG. 4 is a front sectional view showing a second embodiment of the differential gear assembly according to the present invention.
Figure 5:
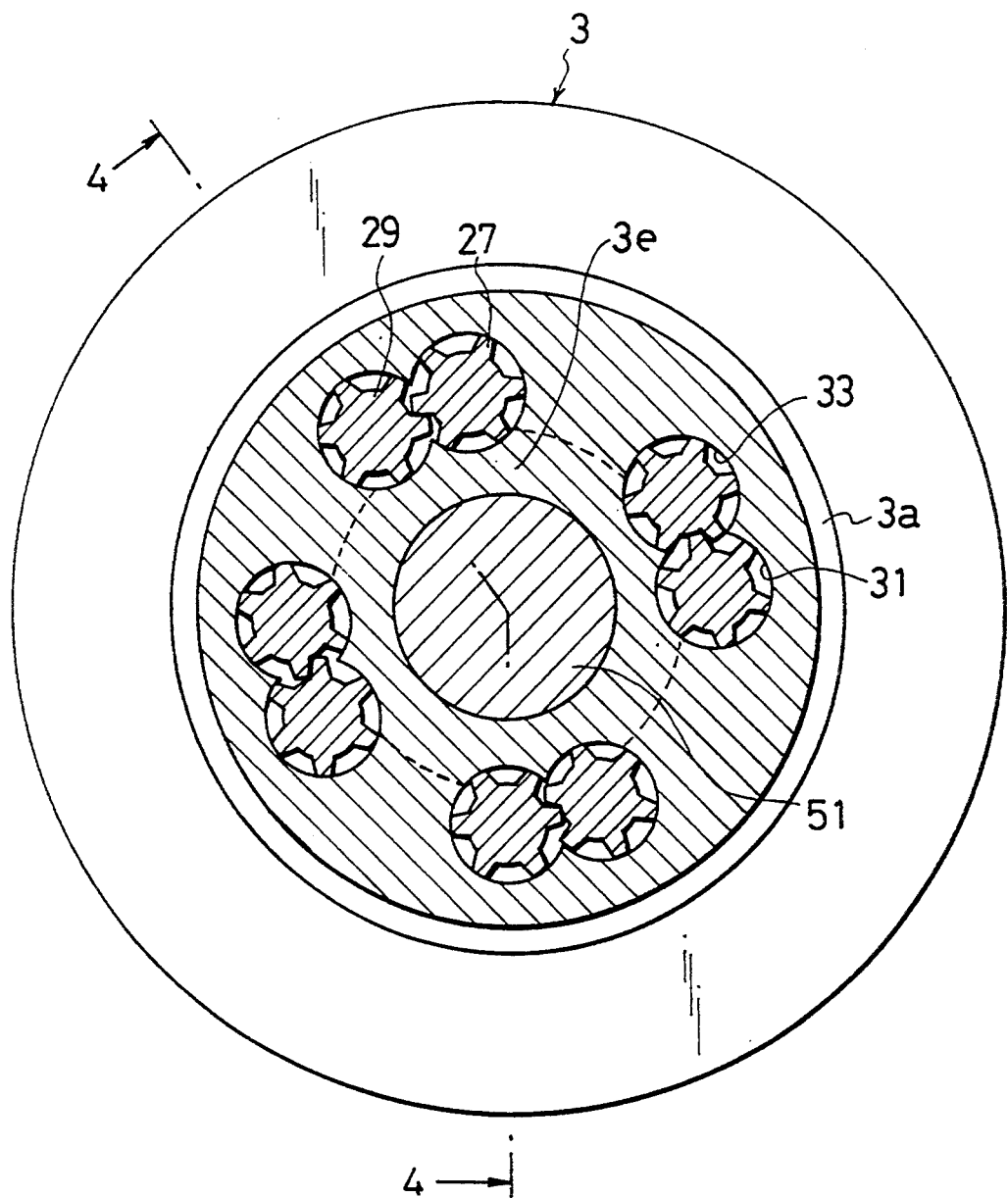
FIG. 5 is a sectional view of the differential gear assembly taken along the line 5—5 in FIG. 4.

Next, with reference to FIGS. 4 and 5, a second embodiment of the limited slip differential gear assembly according to the present invention will be described. FIG. 4 is a front sectional view of the second embodiment of the differential gear assembly according to the present invention and corresponds to a sectional view taken along a line 4—4 in FIG. 5. FIG. 5 is a side sectional view of the differential gear assembly and corresponds to a sectional view taken along a line 5—5 in FIG. 4. In the following description, parts similar to those described in the first embodiment are designated by like reference numerals and will not be given further description.

In the second embodiment of the differential gear assembly 10, the first and second cylindrical bores 31 and 33 penetrate the cylindrical body 3a parallel to the rotational axis. The axial portion of the first pinion gear 27 is further extended to the right to form a shaft portion 27a having no gear teeth. In a similar manner, the axial portion 29a of the second pinion gear extends to the left.

For the first pinion gear 27, the right end of the axial portion 27a abuts the inner surface 43 of the right side wall 3d which radially extends with respect to the rotational axis, and the left end of the first pinion gear 27 is stopped by a stopper piece 45 radially projecting from the boss portion 4, in order to position the first pinion gear 27. The left portion of the first pinion gear 27 protrudes past the cover 3b, so as to be supported by the left side wall 3c and is firmly held in such a manner that the entire circumferential peripheries of the pinion gear 27 are surrounded and supported by the side walls 3c.

The second pinion gear 29 is axially positioned by the inner surface 47 of the left side wall 3c, which radially extends with respect to the rotational axis and on which the left end of an extended shaft portion 29a abuts, and by a stopper piece 49 radially projecting from the boss portion 5. The right portion of the second pinion gear 29 protrudes past the right side wall 3d, so that the second pinion gear 29 is similarly supported and held by the right side wall 3d.

Moreover, as shown in FIG. 5, the cylindrical body 3a extends to the space between the left and right side gears 7 and 9, so as to integrally form a support portion 3e. The axial length of the support portion 3e corresponds to the axial length of the portions of the first and second pinion gears 27 and 29 that are engaged with each other. In accordance with this construction, the bore surface formed by the overlapped first and second bores 31 and 33 in the vicinity of the support portion 3e completely surrounds the outer periphery of the portions of the first and second pinion gears 27 and 29 that are engaged with each other, and the support portion 3e supports the first and second pinion gears 27 and 29 outwardly from the center, thereby restricting the radial displacement of the pinion gears. Therefore, operational role of the support portion 3e is substantially the same as that of the left and right side walls 3c and 3d with the openings 31b and 33b.

The support portion 3e has an inner bore 3f whose diameter is smaller than that of the side gears 7 and 9, and a thrust block 51 is disposed to the inner bore 3f for regulating axial movement of the left and right drive shafts (not shown), each of which is connected to each of the left and right side gears 7 and 9 by a spline.

Furthermore, washers 53 and 55 are provided, respectively, between the left side gear 7 and the left side wall 3c of the differential case 3, and between the right side gear 9 and the right side wall 3d.

In the second embodiment, the right side wall 3d is separable from the cylindrical body 3a. During assembly, the cover 3b and the right side wall 3d are tightly fitted to the cylindrical body 3a by fastening with bolts or welding at connecting portions 57 and 59 after the side gears 7 and 9, the pinion gears 27 and 29 and the thrust block 51 have been provided in the cylindrical body 3a.

In the second embodiment, the circular outer peripheries of at least one end portion of each of the pinion gears 27 and 29 are entirely surrounded and supported by the side walls 3c and 3d, and the first and second pinion gears 27 and 29 are firmly held at the openings 31b and 33b. In addition, the bore surface formed by the overlapped first and second bores 31 and 33 in the vicinity of the support portion 3e completely surrounds the outer periphery of the portions of the first and second pinion gears 27 and 29 that are engaged with each other, and the support portion 3e between the left and right side gears 7 and 9 supports the first and second pinion gears 27 and 29 from the center. Therefore, the center axes of the first and second pinion gears 27 and 29 are always maintained parallel to the rotational axes of the first and second side gears 7 and 9, which leads to an increase in the durability of the pinion gears 27 and 29.

As described above, in accordance with the present invention, the pinion gears are firmly supported and axes of the pinion gears are maintained in constant alignment. Moreover, since the end portions of the pinion gears are exposed to the outside of the differential case 3, lubrication oil can be supplied through the exposed portions of the pinion gears into the differential case 3. Therefore, lubrication of the engaged gears and the surfaces supporting the gears can be properly maintained. This advantage is achieved by the gears being constructed as helical gears.

In addition, since one ends of the pinion gears in the second embodiment are positioned by the snap rings or the radial projection integrally formed on the boss portions, the number of the parts of the differential gear assembly can be reduced, in comparison with the conventional differential gear assembly.

It must be understood that the invention is in no way limited to the above embodiments and that many changes may be brought about therein without departing from the scope of the invention as defined by the appended claims.

What is claimed is:

1. A differential gear assembly comprising:

a case being rotatable around a rotation axis in response to a driving force of a power source and having a pair of walls extending substantially radially and defining axial ends of the case;

first and second side gears coaxially arranged within the case and supported in such a manner that the first and the second side gears are individually rotatable with respect to the rotation axis of the case relative to the case, the first and the second side gears being adapted to be connected to first and second output shafts, respectively;

at least one pair of first and second pinion gears, each of which has a center axis parallel to the rotation axis of the case, the first pinion gear having first and second gearing portions, the second pinion gear having third and fourth gearing portions, the first gearing portion being engaged with the third gearing portion, the second gearing portion being engaged with the first side gear, and the fourth gearing portion being engaged with the second side gear; and a first opening for fittingly receiving the first pinion gear and a second opening for fittingly receiving the second pinion gear, each of the openings being formed in either one of the walls of the case in such a manner that an outer circumferential portion of the first pinion gear is surrounded by the first opening and an outer circumferential portion of the second pinion gear is surrounded by the second opening, wherein each of the walls of the case has a guide boss on which each of the first and second side gears is rotatably supported, respectively, and each of the first and second pinion gears is arranged in an axial bore formed in the case and is axially positioned by positioning means which is provided on either of the walls of the case, said positioning means including a stopper device standing on the case along the radial direction for preventing the first and second pinion gears from axial movement.

2. The differential gear assembly of claim 1, wherein the stopper device is integrally formed on the case.

3. The differential gear assembly of claim 1, wherein the positioning means further includes an inner surface defining a closed end of the axial bore.

4. The differential gear assembly of claim 1, wherein the first and second side gears are disposed at axially opposite sides of the case with a predetermined axial distance therebetween so that the first side gear is located away from tile second side gear.

5. The differential gear assembly of claim 4, further comprising a support member provided between the first and second side gears for supporting the first and second pinion gears so as to prevent the first and second pinion gears from moving toward the rotational axis.

6. The differential gear assembly of claim 5, wherein the support member supports the first gearing portion of the first pinion gear and the third gearing portion of the second pinion gear.

7. The differential gear assembly of claim 4, wherein each of the second gearing portion of the first pinion gear and the fourth gearing portion of the second pinion gear extends to and passes through each of the first and second openings, respectively.

8. The differential gear assembly of claim 1, wherein the wall formed with the first opening is different from the wall formed with the second opening.

9. The differential gear assembly of claim 1, wherein the axial bore includes at least one pair of cylindrical bores overlapping each other.

10. The differential gear assembly of claim 9, wherein each of said pairs of cylindrical bores penetrates the case parallel to the rotational axis.

11. The differential gear assembly of claim 10, wherein each of the first and second pinion gears has a shaft portion that is not provided with gearing teeth.

12. The differential gear assembly of claim 11, wherein the shaft portion of the first pinion gear is aligned with the second side gear without engagement therebetween, and the shaft portion of the second pinion gear is aligned with the first side gear without engagement therebetween.

13. The differential gear assembly of claim 1, wherein the walls of the case are separable from the other portions of the case.

14. The differential gear assembly of claim 1, wherein the first and second pinion gears are helical gears.

15. The differential gear assembly of claim 1, wherein the first and second pinion gears are arranged so that the outer circumferential portions of the first and second pinion gears are exposed to the outside of the case.

16. The differential gear assembly of claim 15, wherein each of the first and second pinion gears penetrates each of the first and second openings, respectively.

17. A differential gear assembly comprising:
a case being rotatable around a rotation axis in response to a driving force of a power source and having a pair of walls extending substantially radially and defining axial ends of the case;
first and second side gears coaxially arranged within the case and supported in such a manner that the first and the second side gears are individually rotatable with respect to the rotation axis of the case relative to the case, the first and the second side gears being adapted to be connected to first and second output shafts, respectively;
at least one pair of first and second pinion gears, each of which has a center axis parallel to the rotation axis of the case, the first pinion gear having first and second gearing portions, the second pinion gear having third and fourth gearing portions, the first gearing portion being engaged with the third gearing portion, the second gearing portion being engaged with the first side gear, and the fourth gearing portion being engaged with the second side gear; and
at least one opening for fittingly receiving the first and second pinion gears, said at least one opening being formed in either one of the walls of the case in such a manner that respective outer circumferential portions of the first and second pinion gears are surrounded by said at least one opening, wherein each of the walls of the case has a guide boss on which each of the first and second side gears is rotatably supported, respectively, and each of the first and second pinion gears is arranged in an axial bore formed in the case and is axially positioned by positioning means which is provided on either of the walls of the case, said positioning means including a stopper device standing on the case along the radial direction for preventing the first and second pinion gears from axial movement.

18. The differential gear assembly of claim 17, wherein the stopper device is integrally formed on the case.

19. The differential gear assembly of claim 17, wherein the positioning means further includes an inner surface defining a closed end of the axial bore.

20. The differential gear assembly of claim 17, wherein the first and second side gears are disposed at axially opposite sides of the case with a predetermined axial distance therebetween so that the first side gear is located away from the second side gear.

21. The differential gear assembly of claim 20, further comprising a support member provided between the first and second side gears for supporting the first and second pinion gears so as to prevent the first and second pinion gears from moving toward the rotational axis.

22. The differential gear assembly of claim 21, wherein the support member supports the first gearing portion of the first pinion gear and the third gearing portion of the second pinion gear.

23. The differential gear assembly of claim 21, wherein each of the second gearing portion of the first pinion gear and the fourth gearing portion of the second pinion gear extends to and gasses through said at least one opening.

24. The differential gear assembly of claim 17, wherein the axial bore includes at least one pair of cylindrical bores overlapping each other.

25. The differential gear assembly of claim 24, wherein each of said pairs of cylindrical bores penetrates the case parallel to the rotational axis.

26. The differential gear assembly of claim 25, wherein each of the first and second pinion gears has a shaft portion that is not provided with gearing teeth.

27. The differential gear assembly of claim 26, wherein the shaft portion of the first pinion gear is aligned with the second side gear without engagement therebetween, and the shaft portion of the second pinion gear is aligned with the first side gear without engagement therebetween.

28. The differential gear assembly of claim 17, wherein the walls of the case are separable from the other portions of the case.

29. The differential gear assembly of claim 17, wherein the first and second pinion gears are helical gears.

30. The differential gear assembly of claim 17, wherein the first and second pinion gears are arranged so that the outer circumferential portions of the first and second pinion gears are exposed to the outside of the case.

31. The differential gear assembly of claim 30, wherein each of the first and second pinion gears penetrates said at least one opening.

* * * * *